United States Patent
Li et al.

(10) Patent No.: US 12,248,321 B2
(45) Date of Patent: *Mar. 11, 2025

(54) SYSTEM AND METHOD FOR GENERATING SIMULATED VEHICLES WITH CONFIGURED BEHAVIORS FOR ANALYZING AUTONOMOUS VEHICLE MOTION PLANNERS

(71) Applicant: TUSIMPLE, INC., San Diego, CA (US)

(72) Inventors: Xingdong Li, San Diego, CA (US); Xing Sun, San Diego, CA (US); Wutu Lin, San Diego, CA (US); Liu Liu, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,721

(22) Filed: Jun. 16, 2023

(65) Prior Publication Data
US 2023/0333554 A1 Oct. 19, 2023

Related U.S. Application Data

(63) Continuation of application No. 17/111,984, filed on Dec. 4, 2020, now Pat. No. 11,681,292, which is a (Continued)

(51) Int. Cl.
*G05D 1/00* (2024.01)
*G06F 30/15* (2020.01)
(Continued)

(52) U.S. Cl.
CPC ......... *G05D 1/0088* (2013.01); *G05D 1/0027* (2013.01); *G05D 1/0223* (2013.01);
(Continued)

(58) Field of Classification Search
CPC .. G05D 1/0027; G05D 1/0088; G05D 1/0223; G05D 2201/0213; G06F 2111/10;
(Continued)

(56) References Cited

U.S. PATENT DOCUMENTS

| 6,777,904 B1 | 8/2004 | Degner |
| 7,103,460 B1 | 9/2006 | Breed |

(Continued)

FOREIGN PATENT DOCUMENTS

| EP | 1754179 A1 | 2/2007 |
| EP | 2448251 A2 | 5/2012 |

(Continued)

OTHER PUBLICATIONS

Chinese 1st Office Action with translation, Appl. No. 2018800774776, Applicant: TuSimple, Inc., dated Apr. 23, 2023, 16 pgs.

(Continued)

*Primary Examiner* — Jonathan L Sample
(74) *Attorney, Agent, or Firm* — Perkins Coie LLP

(57) ABSTRACT

A system and method for generating simulated vehicles with configured behaviors for analyzing autonomous vehicle motion planners are disclosed. A particular embodiment includes: obtaining configuration instructions and data for each of a plurality of simulated vehicles, a specific driving behavior for each of the plurality of simulated vehicles corresponding to perception data obtained from perception data sensors; and generating a plurality of trajectories and acceleration profiles to transition each of the plurality of simulated vehicles from a current position and speed to a corresponding target position and target speed, the target position and the target speed corresponding to the specific driving behavior for each of the plurality of simulated vehicles.

20 Claims, 3 Drawing Sheets

Related U.S. Application Data continuation of application No. 15/827,583, filed on Nov. 30, 2017, now Pat. No. 10,860,018.

(51) Int. Cl.

| | | |
|---|---|---|
| *G06F 30/20* | (2020.01) | |
| *G09B 9/00* | (2006.01) | |
| *G09B 9/04* | (2006.01) | |
| *G09B 9/048* | (2006.01) | |
| *G09B 19/16* | (2006.01) | |
| *G06F 111/10* | (2020.01) | |

(52) U.S. Cl.
CPC ............. *G06F 30/15* (2020.01); *G06F 30/20* (2020.01); *G09B 9/00* (2013.01); *G09B 9/04* (2013.01); *G09B 9/048* (2013.01); *G09B 19/167* (2013.01); *G06F 2111/10* (2020.01)

(58) Field of Classification Search
CPC ....... G06F 30/15; G06F 30/20; G09B 19/167; G09B 9/00; G09B 9/04; G09B 9/048
USPC ..................................................... 701/23–28
See application file for complete search history.

(56) References Cited

U.S. PATENT DOCUMENTS

| | | | |
|---|---|---|---|
| 7,689,559 B2 | 3/2010 | Canright | |
| 7,783,403 B2 | 8/2010 | Breed | |
| 7,844,595 B2 | 11/2010 | Canright | |
| 8,041,111 B1 | 10/2011 | Wilensky | |
| 8,064,643 B2 | 11/2011 | Stein | |
| 8,082,101 B2 | 12/2011 | Stein | |
| 8,164,628 B2 | 4/2012 | Stein | |
| 8,175,376 B2 | 5/2012 | Marchesotti | |
| 8,271,871 B2 | 9/2012 | Marchesotti | |
| 8,378,851 B2 | 2/2013 | Stein | |
| 8,392,117 B2 | 3/2013 | Dolgov | |
| 8,401,292 B2 | 3/2013 | Park | |
| 8,412,449 B2 | 4/2013 | Trepagnier | |
| 8,478,072 B2 | 7/2013 | Aisaka | |
| 8,553,088 B2 | 10/2013 | Stein | |
| 8,788,134 B1 | 7/2014 | Litkouhi | |
| 8,908,041 B2 | 12/2014 | Stein | |
| 8,917,169 B2 | 12/2014 | Schofield | |
| 8,963,913 B2 | 2/2015 | Baek | |
| 8,965,621 B1 | 2/2015 | Urmson | |
| 8,981,966 B2 | 3/2015 | Stein | |
| 8,993,951 B2 | 3/2015 | Schofield | |
| 9,002,632 B1 | 4/2015 | Emigh | |
| 9,008,369 B2 | 4/2015 | Schofield | |
| 9,025,880 B2 | 5/2015 | Perazzi | |
| 9,042,648 B2 | 5/2015 | Wang | |
| 9,111,444 B2 | 8/2015 | Kaganovich | |
| 9,117,133 B2 | 8/2015 | Barnes | |
| 9,118,816 B2 | 8/2015 | Stein | |
| 9,120,485 B1 | 9/2015 | Dolgov | |
| 9,122,954 B2 | 9/2015 | Srebnik | |
| 9,134,402 B2 | 9/2015 | Sebastian | |
| 9,145,116 B2 | 9/2015 | Clarke | |
| 9,147,255 B1 | 9/2015 | Zhang | |
| 9,156,473 B2 | 10/2015 | Clarke | |
| 9,176,006 B2 | 11/2015 | Stein | |
| 9,179,072 B2 | 11/2015 | Stein | |
| 9,183,447 B1 | 11/2015 | Gdalyahu | |
| 9,185,360 B2 | 11/2015 | Stein | |
| 9,191,634 B2 | 11/2015 | Schofield | |
| 9,233,659 B2 | 1/2016 | Rosenbaum | |
| 9,233,688 B2 | 1/2016 | Clarke | |
| 9,239,995 B2 * | 1/2016 | Oshiro | ................ G06Q 10/047 |
| 9,248,832 B2 | 2/2016 | Huberman | |
| 9,248,835 B2 | 2/2016 | Tanzmeister | |
| 9,251,708 B2 | 2/2016 | Rosenbaum | |
| 9,277,132 B2 | 3/2016 | Berberian | |
| 9,280,711 B2 | 3/2016 | Stein | |
| 9,286,522 B2 | 3/2016 | Stein | |
| 9,297,641 B2 | 3/2016 | Stein | |
| 9,299,004 B2 | 3/2016 | Lin | |
| 9,315,192 B1 | 4/2016 | Zhu | |
| 9,317,033 B2 | 4/2016 | Ibanez-guzman | |
| 9,317,776 B1 | 4/2016 | Honda | |
| 9,330,334 B2 | 5/2016 | Lin | |
| 9,342,074 B2 | 5/2016 | Dolgov | |
| 9,355,635 B2 | 5/2016 | Gao | |
| 9,365,214 B2 | 6/2016 | Ben Shalom | |
| 9,399,397 B2 | 7/2016 | Mizutani | |
| 9,428,192 B2 | 8/2016 | Schofield | |
| 9,436,880 B2 | 9/2016 | Bos | |
| 9,438,878 B2 | 9/2016 | Niebla | |
| 9,443,163 B2 | 9/2016 | Springer | |
| 9,446,765 B2 | 9/2016 | Ben Shalom | |
| 9,459,515 B2 | 10/2016 | Stein | |
| 9,466,006 B2 | 10/2016 | Duan | |
| 9,476,970 B1 | 10/2016 | Fairfield | |
| 9,490,064 B2 | 11/2016 | Hirosawa | |
| 9,531,966 B2 | 12/2016 | Stein | |
| 9,535,423 B1 | 1/2017 | Debreczeni | |
| 9,555,803 B2 | 1/2017 | Pawlicki | |
| 9,568,915 B1 | 2/2017 | Berntorp | |
| 9,587,952 B1 | 3/2017 | Slusar | |
| 9,632,502 B1 | 4/2017 | Levinson | |
| 9,645,577 B1 | 5/2017 | Frazzoli | |
| 9,701,239 B2 | 7/2017 | Kentley | |
| 9,720,418 B2 | 8/2017 | Stenneth | |
| 9,723,097 B2 | 8/2017 | Harris | |
| 9,723,099 B2 | 8/2017 | Chen | |
| 9,738,280 B2 | 8/2017 | Rayes | |
| 9,746,550 B2 | 8/2017 | Nath | |
| 10,019,011 B1 | 7/2018 | Green | |
| 10,309,792 B2 | 6/2019 | Iagnemma | |
| 10,506,838 B2 * | 12/2019 | Tammam | ............... H04R 5/033 |
| 10,860,018 B2 * | 12/2020 | Li | ............ G09B 9/048 |
| 2004/0176936 A1 | 9/2004 | Ohtsu | |
| 2005/0004723 A1 * | 1/2005 | Duggan | ................. B64C 19/00 |
| | | | 701/13 |
| 2006/0040239 A1 * | 2/2006 | Cummins | ................ G09B 9/05 |
| | | | 434/62 |
| 2007/0230792 A1 | 10/2007 | Shashua | |
| 2008/0249667 A1 | 10/2008 | Horvitz | |
| 2008/0300745 A1 | 12/2008 | Goossen | |
| 2009/0040054 A1 | 2/2009 | Wang | |
| 2009/0276111 A1 | 11/2009 | Wang | |
| 2010/0049397 A1 | 2/2010 | Lin | |
| 2010/0106356 A1 * | 4/2010 | Trepagnier | ........... G05D 1/0214 |
| | | | 701/25 |
| 2010/0226564 A1 | 9/2010 | Marchesotti | |
| 2010/0256836 A1 * | 10/2010 | Mudalige | ................. G08G 1/22 |
| | | | 701/25 |
| 2010/0281361 A1 | 11/2010 | Marchesotti | |
| 2011/0206282 A1 | 8/2011 | Aisaka | |
| 2012/0105639 A1 | 5/2012 | Stein | |
| 2012/0140076 A1 | 6/2012 | Rosenbaum | |
| 2012/0274629 A1 | 11/2012 | Baek | |
| 2014/0145516 A1 | 5/2014 | Hirosawa | |
| 2014/0198184 A1 | 7/2014 | Stein | |
| 2014/0236414 A1 | 8/2014 | Droz | |
| 2015/0062304 A1 | 3/2015 | Stein | |
| 2015/0081156 A1 | 3/2015 | Trepagnier | |
| 2015/0284010 A1 | 10/2015 | Beardsley | |
| 2015/0353082 A1 | 12/2015 | Lee | |
| 2016/0003636 A1 * | 1/2016 | Ng-Thow-Hing | ... G01C 21/365 |
| | | | 701/418 |
| 2016/0037064 A1 | 2/2016 | Stein | |
| 2016/0094774 A1 | 3/2016 | Li | |
| 2016/0129907 A1 * | 5/2016 | Kim | ..................... G06V 20/588 |
| | | | 701/26 |
| 2016/0165157 A1 | 6/2016 | Stein | |
| 2016/0210528 A1 | 7/2016 | Duan | |
| 2016/0314224 A1 * | 10/2016 | Wei | ..................... G05D 1/0088 |
| 2016/0321381 A1 | 11/2016 | English | |
| 2016/0375907 A1 | 12/2016 | Erban | |
| 2017/0024500 A1 * | 1/2017 | Sebastian | .............. H04W 4/046 |
| 2017/0123421 A1 | 5/2017 | Kentley | |
| 2017/0123428 A1 | 5/2017 | Levinson | |

(56) References Cited

U.S. PATENT DOCUMENTS

| | | | | |
|---|---|---|---|---|
| 2017/0123429 | A1* | 5/2017 | Levinson | B60W 50/00 |
| 2017/0287335 | A1 | 10/2017 | Ansari | |
| 2018/0089563 | A1 | 3/2018 | Redding | |
| 2018/0141544 | A1* | 5/2018 | Xiao | G01C 21/3469 |
| 2018/0336297 | A1* | 11/2018 | Sun | G01M 17/00 |
| 2019/0025841 | A1* | 1/2019 | Haynes | B60W 30/00 |
| 2019/0034794 | A1* | 1/2019 | Ogale | G05D 1/0212 |
| 2019/0072965 | A1* | 3/2019 | Zhang | G08G 1/166 |
| 2019/0072966 | A1* | 3/2019 | Zhang | G05D 1/646 |
| 2019/0072973 | A1* | 3/2019 | Sun | B62D 15/025 |
| 2019/0113927 | A1* | 4/2019 | Englard | G06F 16/285 |
| 2019/0129436 | A1* | 5/2019 | Sun | G06N 20/00 |
| 2019/0163181 | A1* | 5/2019 | Liu | G05D 1/0212 |
| 2019/0163182 | A1* | 5/2019 | Li | G05D 1/0088 |
| 2019/0318627 | A1* | 10/2019 | Raaijmakers | G08G 1/09626 |
| 2019/0378041 | A1* | 12/2019 | Dhansri | B60W 30/14 |
| 2020/0346659 | A1* | 11/2020 | Düser | B60W 30/18072 |
| 2021/0089032 | A1 | 3/2021 | Li | |

FOREIGN PATENT DOCUMENTS

| | | | |
|---|---|---|---|
| EP | | 2463843 A2 | 6/2012 |
| EP | | 2463843 A3 | 7/2013 |
| EP | | 2761249 A1 | 8/2014 |
| EP | | 2463843 B1 | 7/2015 |
| EP | | 2448251 A3 | 10/2015 |
| EP | | 2946336 A2 | 11/2015 |
| EP | | 2993654 A1 | 3/2016 |
| EP | | 3081419 A1 | 10/2016 |
| WO | WO/2005/098739 A1 | | 10/2005 |
| WO | WO/2005/098751 A1 | | 10/2005 |
| WO | WO/2005/098782 | | 10/2005 |
| WO | WO/2010/109419 A1 | | 9/2010 |
| WO | WO/2013/045612 | | 4/2013 |
| WO | WO/2014/111814 A2 | | 7/2014 |
| WO | WO/2014/111814 A3 | | 7/2014 |
| WO | WO/2014/201324 | | 12/2014 |
| WO | WO/2015/083009 | | 6/2015 |
| WO | WO/2015/103159 A1 | | 7/2015 |
| WO | WO/2015/125022 | | 8/2015 |
| WO | WO/2015/186002 A2 | | 12/2015 |
| WO | WO/2015/186002 A3 | | 12/2015 |
| WO | WO/2016/135736 | | 9/2016 |
| WO | WO/2017/013875 A1 | | 1/2017 |

OTHER PUBLICATIONS

Hou, Xiaodi and Zhang, Liqing, "Saliency Detection: A Spectral Residual Approach", Computer Vision and Pattern Recognition, CVPR'07—IEEE Conference, pp. 1-8, 2007.

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching For Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Thumbnail Generation Based on Global Saliency", Advances in Cognitive Neurodynamics, ICCN 2007, pp. 999-1003, Springer Netherlands, 2008.

Hou, Xiaodi and Yuille, Alan and Koch, Christof, "A Meta-Theory of Boundary Detection Benchmarks", arXiv preprint arXiv:1302.5985, 2013.

Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.

Li, Yanghao and Wang, Naiyan and Liu, Jiaying and Hou, Xiaodi, "Demystifying Neural Style Transfer", arXiv preprint arXiv:1701.01036, 2017.

Hou, Xiaodi and Zhang, Liqing, "A Time-Dependent Model of Information Capacity of Visual Attention", International Conference on Neural Information Processing, pp. 127-136, Springer Berlin Heidelberg, 2006.

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.

Li, Yanghao and Wang, Naiyan and Liu, Jiaying and Hou, Xiaodi, "Factorized Bilinear Models for Image Recognition", arXiv preprint arXiv:1611.05709, 2016.

Hou, Xiaodi, "Computational Modeling and Psychophysics in Low and Mid-Level Vision", California Institute of Technology, 2014.

Spinello, Luciano, Triebel, Rudolph, Siegwart, Roland, "Multiclass Multimodal Detection and Tracking In Urban Environments", Sage Journals, vol. 29 issue: 12, pp. 1498-1515 Article first published online: Oct. 7, 2010; Issue published: Oct. 1, 2010.

Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.

Kyoungho Ahn, Hesham Rakha, "The Effects of Route Choice Decisions on Vehicle Energy Consumption and Emissions", Virginia Tech Transportation Institute, Blacksburg, VA 24061, date unknown.

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.

Schroff, Florian, Dmitry Kalenichenko, James Philbin, (Google), "FaceNet: A Unified Embedding for Face Recognition and Clustering", CVPR 2015.

Dai, Jifeng, Kaiming He, Jian Sun, (Microsoft Research), "Instance-aware Semantic Segmentation via Multi-task Network Cascades", CVPR 2016.

Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.

Tian Li, "Proposal Free Instance Segmentation Based on Instance-aware Metric", Department of Computer Science, Cranberry-Lemon University, Pittsburgh, PA., date unknown.

Mohammad Norouzi, David J. Fleet, Ruslan Salakhutdinov, "Hamming Distance Metric Learning", Departments of Computer Science and Statistics, University of Toronto, date unknown.

Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.

MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.

Kendall, Alex, Gal, Yarin, "What Uncertainties Do We Need in Bayesian Deep Learning for Computer Vision", arXiv:1703.04977v1 [cs.CV] Mar. 15, 2017.

Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.

(56) References Cited

OTHER PUBLICATIONS

Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.

Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.

P. Guarneri, G. Rocca and M. Gobbi, "A Neural-Network-Based Model for the Dynamic Simulation of the Tire/ Suspension System While Traversing Road Irregularities," in IEEE Transactions on Neural Networks, vol. 19, No. 9, pp. 1549-1563, Sep. 2008.

C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.

Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.

Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.

Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.

Adhiraj Somani, Nan Ye, David Hsu, and Wee Sun Lee, "DESPOT: Online POMDP Planning with Regularization", Department of Computer Science, National University of Singapore, date unknown.

Adam Paszke, Abhishek Chaurasia, Sangpil Kim, and Eugenio Culurciello. Enet: A deep neural network architecture for real-time semantic segmentation. CoRR, abs/1606.02147, 2016.

Szeliski, Richard, "Computer Vision: Algorithms and Applications" http://szeliski.org/Book/, 2010.

PCT International Search Report and Written Opinion, International Appl. No. PCT/US2018/063405, International Filing Date: Nov. 30, 2018, Applicant: TuSimple, mailing date: Feb. 26, 2019.

\* cited by examiner

SYSTEM AND METHOD FOR GENERATING SIMULATED VEHICLES WITH CONFIGURED BEHAVIORS FOR ANALYZING AUTONOMOUS VEHICLE MOTION PLANNERS

CROSS-REFERENCE TO RELATED APPLICATIONS

This application is a continuation of U.S. patent application Ser. No. 17/111,984, titled "SYSTEM AND METHOD FOR GENERATING SIMULATED VEHICLES WITH CONFIGURED BEHAVIORS FOR ANALYZING AUTONOMOUS VEHICLE MOTION PLANNERS," filed Dec. 4, 2020, which is a continuation of U.S. patent application Ser. No. 15/827,583, titled "SYSTEM AND METHOD FOR GENERATING SIMULATED VEHICLES WITH CONFIGURED BEHAVIORS FOR ANALYZING AUTONOMOUS VEHICLE MOTION PLANNERS," filed Nov. 30, 2017, the disclosures of which are hereby incorporated by reference in their entirety herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2023, TuSimple, Inc., All Rights Reserved.

TECHNICAL FIELD

This patent document pertains generally to tools (systems, apparatuses, methodologies, computer program products, etc.) for autonomous driving simulation systems, trajectory planning, vehicle control systems, and autonomous driving systems, and more particularly, but not by way of limitation, to a system and method for generating simulated vehicles with configured behaviors for analyzing autonomous vehicle motion planners.

BACKGROUND

An autonomous vehicle is often configured to follow a trajectory based on a computed driving path generated by a motion planner. However, when variables such as obstacles (e.g., other dynamic vehicles) are present on the driving path, the autonomous vehicle must use its motion planner to modify the computed driving path and perform corresponding control operations so the vehicle may be safely driven by changing the driving path to avoid the obstacles. Motion planners for autonomous vehicles can be very difficult to build and configure. The logic in the motion planner must be able to anticipate, detect, and react to a variety of different driving scenarios, such as the actions of the dynamic vehicles in proximity to the autonomous vehicle. In most cases, it is not feasible and even dangerous to test autonomous vehicle motion planners in real world driving environments. As such, simulators can be used to test autonomous vehicle motion planners. However, to be effective in testing autonomous vehicle motion planners, these simulators must be able to realistically model the behaviors of the simulated dynamic vehicles in proximity to the autonomous vehicle in a variety of different scenarios. Conventional simulators have been unable to overcome the challenges of modeling driving behaviors of the simulated proximate dynamic vehicles to make the behaviors of the simulated dynamic vehicles as similar to real driver behaviors as possible. Moreover, conventional simulators have been unable to achieve a level of efficiency and capacity necessary to provide an acceptable test tool for autonomous vehicle motion planners.

SUMMARY

A system and method for generating simulated vehicles with configured behaviors for analyzing autonomous vehicle motion planners is disclosed herein. Specifically, the present disclosure describes a dynamic vehicle simulation system to generate simulated dynamic vehicles with various driving behaviors to test, evaluate, or otherwise analyze autonomous vehicle motion planning systems, which will be used in real autonomous vehicles in actual driving environments. The simulated dynamic vehicles (also denoted herein as non-player characters or NPC vehicles) generated by the simulation system of various example embodiments described herein can model the vehicle behaviors that would be performed by actual vehicles in the real world, including lane change, overtaking, acceleration behaviors, and the like.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

A system and method for generating simulated vehicles with configured behaviors for analyzing autonomous vehicle motion planners is disclosed herein. Specifically, the present disclosure describes a dynamic vehicle simulation system to generate simulated dynamic vehicles with various driving behaviors to test, evaluate, or otherwise analyze autonomous vehicle motion planning systems, which will be used in real autonomous vehicles in actual driving environments. The simulated dynamic vehicles (also denoted herein as non-player characters or NPC vehicles) generated by the simulation system of various example embodiments described herein can model the vehicle behaviors that would be performed by actual vehicles in the real world, including lane change, overtaking, acceleration behaviors, and the like.

Figure 1:
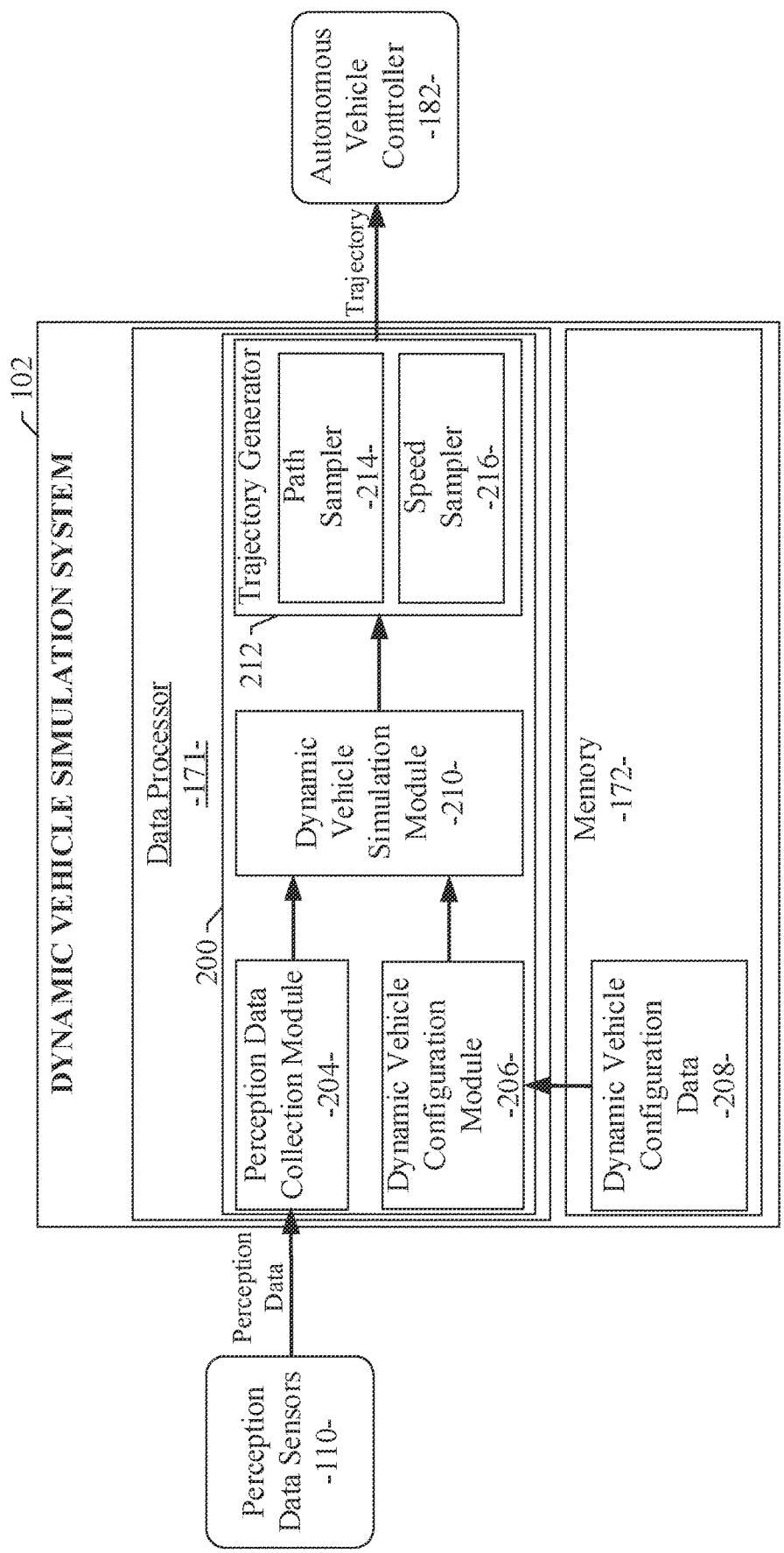
FIG. 1 illustrates the components of the dynamic vehicle simulation system of an example embodiment.

Referring to FIG. 1, a diagram illustrates the components of an example embodiment of the dynamic vehicle simulation system 102 and the dynamic vehicle simulation module 200 therein. In particular, the dynamic vehicle simulation system 102 can include a perception data collection module 204. The perception data collection module 204 can be executed by a data processor 171 of the dynamic vehicle simulation system 102. The perception data collection module 204 can include an array of interfaces for receiving perception data from a plurality of perception information sensing devices or perception data sensors 110. The perception data sensors 110 may include image generating devices (e.g., cameras), light amplification by stimulated emission of radiation (laser) devices, light detection and ranging (LIDAR) devices, global positioning system (GPS) devices, sound navigation and ranging (sonar) devices, radio detection and ranging (radar) devices, other distance measuring systems, and the like. The perception data gathered by the perception data sensors 110 at various traffic locations can include traffic or vehicle image data, roadway data, environmental data, distance data from LIDAR or radar devices, and other sensor information received from the perception data sensors 110 positioned adjacent to particular roadways (e.g., monitored locations) or installed on stationary test vehicles. Additionally, the perception data sensors 110 can include perception data gathering devices installed in or on moving test vehicles being navigated through pre-defined routings in an environment or location of interest. The perception data can include data from which a presence, position, and velocity of neighboring vehicles in the vicinity of or proximate to a host vehicle, autonomous vehicle, or simulated vehicle can be obtained or calculated.

The perception data collection module 204 can collect actual trajectories of vehicles under different scenarios and different driver behaviors. The different scenarios can correspond to different locations, different traffic patterns, different environmental conditions, and the like. The scenarios can be represented, for example, by an occupancy grid, a collection of vehicle states on a map, or a graphical representation, such as a top-down image of one or more areas of interest. The driver behaviors can correspond to a driver's short term driving activity, such as changing lanes to the left or right, overtaking other vehicles, accelerating/decelerating, merging to/from a ramp, making left or right turn at an intersection, making a U-turn, and the like. The driver behaviors can also correspond to a set of driver or vehicle control actions to accomplish the particular short term driving activity.

The image data and other perception data collected by the perception data collection module 204 reflects truly realistic, real-world traffic environment information related to the locations or routings, the scenarios, and the driver behaviors being monitored. Using the standard capabilities of well-known data collection devices, the gathered traffic and vehicle image data and other perception or sensor data can be wirelessly transferred (or otherwise transferred) to a data processor of a standard computing system, upon which the perception data collection module 204 can be executed. Alternatively, the gathered traffic and vehicle image data and other perception or sensor data can be stored in a memory device at the monitored location or in the test vehicle and transferred later to the data processor of the standard computing system. The traffic and vehicle image data and other perception or sensor data, and the driver behavior data gathered or calculated by the perception data collection module 204 can be used to generate simulated proximate dynamic vehicles for a simulation environment as described in more detail below.

Referring again FIG. 1, additional components of the dynamic vehicle simulation system 102 are illustrated. As described above, the dynamic vehicle simulation system 102 can gather the perception data collected by the perception data collection module 204. This perception data can be used in a simulation environment, produced by the dynamic vehicle simulation system 102, to create corresponding simulations of proximate dynamic vehicles or object trajectories in the simulation environment. As a result, the example embodiments use the perception data collection module 204 to collect perception data that can be used to infer corresponding human driving behaviors. Then, the example embodiments can use the dynamic vehicle simulation system 102 in the simulation environment to simulate proximate dynamic vehicles with configurable human driving behaviors based in part on the collected perception data.

Referring still FIG. 1, the dynamic vehicle simulation system 102 can include a dynamic vehicle configuration module 206, a set of dynamic vehicle configuration data 208, and a dynamic vehicle simulation module 210. The dynamic vehicle configuration module 206 and the dynamic vehicle simulation module 210 can be executed by a data processor 171 of the dynamic vehicle simulation system 102. The dynamic vehicle configuration data 208 can be stored in a memory device or system 172 of the dynamic vehicle simulation system 102. The dynamic vehicle configuration module 206 can be configured to read portions of the pre-defined data retained as the dynamic vehicle configuration data 208 to obtain pre-defined parameters and executables for each of a plurality of dynamic vehicles being simulated by the dynamic vehicle simulation module 210, described in more detail below. The pre-defined parameters and executables for each simulated dynamic vehicle constitute configuration instructions and data defining a specific driving behavior for each of a plurality of dynamic vehicles being simulated. The configuration instructions and data enable the dynamic vehicle simulation module 210 to generate a simulation of a particular dynamic vehicle with a specific driving behavior. For example, the configuration instructions and data for a particular dynamic vehicle can cause the dynamic vehicle simulation module 210 to generate a simulation of the particular dynamic vehicle with an aggressive driving behavior. In the example, the aggressive driving behavior can correspond to a simulated dynamic vehicle that frequently changes lanes, exhibits steep acceleration and deceleration rates, and travels close to other neighboring vehicles. In contrast, the configuration instructions and data for a particular dynamic vehicle can cause the dynamic vehicle simulation module 210 to generate a simulation of the particular dynamic vehicle with a conservative driving behavior. In this example, the conservative driving behavior can correspond to a simulated dynamic vehicle that infrequently changes lanes, exhibits moderate acceleration and deceleration rates, and maintains a greater distance from other neighboring vehicles. It will be apparent to those of ordinary skill in the art in view of the disclosure herein that a variety of other specific driving behaviors can be simulated using the configuration instructions and data defined in the dynamic vehicle configuration data 208 and processed by the dynamic vehicle configuration module 206.

The dynamic vehicle simulation module 210, of an example embodiment as shown in FIG. 1, can receive the perception data from the perception data collection module 204 and the configuration instructions and data for each dynamic vehicle to be simulated. The received perception data can inform the dynamic vehicle simulation module 210 of the environment surrounding the particular dynamic vehicle being simulated. For example, the perception data can include information indicative of the presence, position, and velocity of neighboring vehicles in the vicinity of or proximate to a host vehicle, an autonomous vehicle, or simulated dynamic vehicle. The perception data can also include information indicative of the presence and position of obstacles, the location of the available roadways, and other environmental information. The configuration instructions and data for each dynamic vehicle to be simulated can inform the dynamic vehicle simulation module 210 of the specific configurable driving behaviors to be modeled for the particular dynamic vehicle being simulated. Given the perception data and the configuration instructions and data for each dynamic vehicle being simulated, the dynamic vehicle simulation module 210 can generate a proposed or target position, speed, and heading for each particular dynamic vehicle being simulated at specific points in time. The proposed or target position, speed, and heading for each simulated dynamic vehicle can be generated based on the received perception data and the specific configuration instructions and data. In an example embodiment, the dynamic vehicle simulation module 210 can use a rule-based process and corresponding data structures to determine and generate the target position, speed, and heading corresponding to the specific behavior of each simulated dynamic vehicle based on the configuration instructions and data corresponding to each simulated dynamic vehicle. In the example embodiment, the specific behavior of a simulated dynamic vehicle, as represented in the rule-based process and corresponding data structures, can be modeled using the target position and direction of the simulated dynamic vehicle along with the target speed of the simulated dynamic vehicle. The target position/direction and target speed of the simulated dynamic vehicle correspond to the position and speed of a vehicle that would be expected given the pre-defined dynamic vehicle configuration data 208 as described above. Thus, the target position/direction and target speed of the simulated dynamic vehicle correspond to the pre-configured behavior for a specific simulated dynamic vehicle. Because the target position/direction and target speed of the simulated dynamic vehicle correspond to the pre-configured behavior, the target position/direction and target speed of each simulated dynamic vehicle is likely to be different. For example, a particular simulated dynamic vehicle having a pre-configured behavior corresponding to an aggressive driver may be more likely (higher probability) to have a determined target position/direction and target speed associated with a lane change, passing maneuver, sharp turn, or sudden stop. A different simulated dynamic vehicle having a pre-configured behavior corresponding to a conservative driver may be less likely (lower probability) to have a determined target position/direction and target speed associated with a lane change, passing maneuver, sharp turn, or sudden stop. As a result, a target position/direction and target speed of each simulated dynamic vehicle conforming to the configured driving behavior for each simulated dynamic vehicle can be generated by the dynamic vehicle simulation module 210. The target position/direction and target speed can be passed to a trajectory generator 212 as shown in FIG. 1.

As illustrated in FIG. 1, the trajectory generator 212 can receive the target position/direction and target speed generated by the dynamic vehicle simulation module 210 for each simulated dynamic vehicle as described above. The trajectory generator 212 can generate a trajectory to transition a particular simulated dynamic vehicle from its current position/direction and speed to the target position/direction and target speed as generated by the dynamic vehicle simulation module 210. In an example embodiment, the trajectory generator 212 can include a path sampler module 214 and a speed sampler module 216. The path sampler module 214 can generate multiple paths or trajectories from the particular simulated dynamic vehicle's current position to the target position. The multiple trajectories enable a selection of a particular trajectory based on the presence of obstacles or the accommodation of other simulation goals, such as safety, fuel-efficiency, and the like. The speed sampler module 216 can generate multiple acceleration profiles to transition the particular simulated dynamic vehicle from its current speed to the target speed. Again, the multiple acceleration profiles enable a selection of a particular acceleration profile based on the presence of obstacles or the accommodation of other simulation goals, such as safety, fuel-efficiency, and the like. The multiple trajectories and multiple acceleration profiles for each simulated dynamic vehicle can be represented as waypoints each having a corresponding position, speed, acceleration, and time. The waypoints generated by the trajectory generator 212 can represent the movements and behaviors of each simulated dynamic vehicle in the simulation environment. As shown in FIG. 1, the trajectory corresponding to each of a plurality of simulated dynamic vehicles can be provided as an output from the dynamic vehicle simulation system 102 and an input to an autonomous vehicle controller 182. The autonomous vehicle controller 182 can include a motion planner module used to generate a trajectory for an autonomous vehicle based on the environment around the autonomous vehicle and the destination or goals of the autonomous vehicle. The environment around the autonomous vehicle can include the presence, position, heading, and speed of proximate vehicles or other objects near the autonomous vehicle. Given the trajectories corresponding to a plurality of simulated dynamic vehicles as provided by the dynamic vehicle simulation system 102, the motion planner module in the autonomous vehicle controller 182 can be stimulated to react to the presence and behavior of the simulated dynamic vehicles just as the motion planner would react to the presence and behavior of real vehicles in a real world driving environment. In this manner, the dynamic vehicle simulation system 102 can be used to produce trajectories corresponding to a plurality of simulated dynamic vehicles, which can be used to stimulate the motion planner of an autonomous vehicle. The trajectories produced by the motion planner in response to the plurality of simulated dynamic vehicles can be analyzed to determine if the motion planner is producing acceptable output. As described above, the behaviors of the simulated dynamic vehicles generated by the dynamic vehicle simulation system 102 can be configured, modified, and specifically tuned to produce a wide range of driving behaviors, environments, scenarios, and tests to exercise the full capabilities of the autonomous vehicle motion planner. As a result of the processing performed by the dynamic vehicle simulation system 102 as described above, data corresponding to simulated driver and vehicle behaviors and corresponding simulated dynamic vehicle trajectories can be produced. Ultimately, the dynamic vehicle simulation system 102 can be used to provide highly configurable simulated traffic trajectory information to a user or for configuration or analysis of a control system of an autonomous vehicle. In particular, the simulated traffic trajectory information can be used to create a virtual world where a control system for an autonomous vehicle can be analyzed, modified, and improved. The virtual world is configured to be identical (as possible) to the real world where vehicles are operated by human drivers. In other words, the simulated traffic trajectory information generated by the dynamic vehicle simulation system 102 is highly useful for configuring and analyzing the control systems of an autonomous vehicle. It will be apparent to those of ordinary skill in the art that the dynamic vehicle simulation system 102 and the simulated traffic trajectory information described and claimed herein can be implemented, configured, processed, and used in a variety of other applications and systems as well.

Referring again to FIG. 1, the dynamic vehicle simulation system 102 can be configured to include executable modules developed for execution by a data processor 171 in a computing environment of the dynamic vehicle simulation system 102 and the dynamic vehicle simulation module 200 therein. In the example embodiment, the dynamic vehicle simulation module 200 can be configured to include the plurality of executable modules as described above. A data storage device or memory 172 can also be provided in the dynamic vehicle simulation system 102 of an example embodiment. The memory 172 can be implemented with standard data storage devices (e.g., flash memory, DRAM, SIM cards, or the like) or as cloud storage in a networked server. In an example embodiment, the memory 172 can be used to store the set of dynamic vehicle configuration data 208 as described above. In various example embodiments, the set of dynamic vehicle configuration data 208 can be configured to simulate more than the typical driving behaviors. To simulate an environment that is identical to the real world as much as possible, the dynamic vehicle configuration data 208 can represent typical driving behaviors, which represent average drivers. Additionally, the dynamic vehicle configuration data 208 can also represent atypical driving behaviors. In most cases, the trajectories corresponding to the plurality of simulated dynamic vehicles include typical and atypical driving behaviors. As a result, autonomous vehicle motion planners can be stimulated by the dynamic vehicle simulation system 102 using trajectories related to the driving behaviors of polite and impolite drivers as well as patient and impatient drivers in the virtual world. In all, the simulated dynamic vehicles can be configured with data representing driving behaviors that are as varied as possible.

Figure 2:
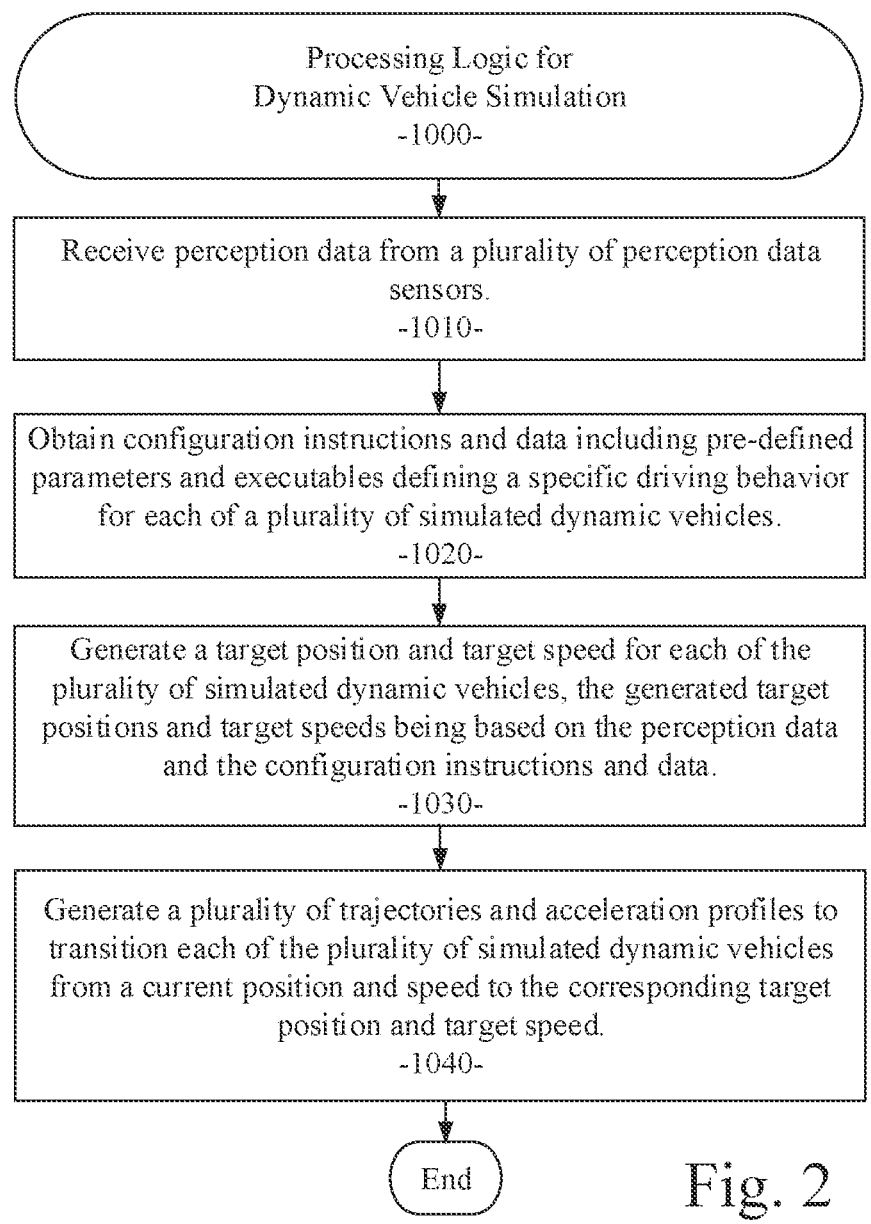
FIG. 2 is a process flow diagram illustrating an example embodiment of a system and method for generating simulated vehicles with configured behaviors for analyzing autonomous vehicle motion planners.

Referring now to FIG. 2, a flow diagram illustrates an example embodiment of a system and method 1000 for dynamic vehicle simulation. The example embodiment can be configured for: receiving perception data from a plurality of perception data sensors (processing block 1010); obtaining configuration instructions and data including pre-defined parameters and executables defining a specific driving behavior for each of a plurality of simulated dynamic vehicles (processing block 1020); generating a target position and target speed for each of the plurality of simulated dynamic vehicles, the generated target positions and target speeds being based on the perception data and the configuration instructions and data (processing block 1030); and generating a plurality of trajectories and acceleration profiles to transition each of the plurality of simulated dynamic vehicles from a current position and speed to the corresponding target position and target speed (processing block 1040).

Figure 3:
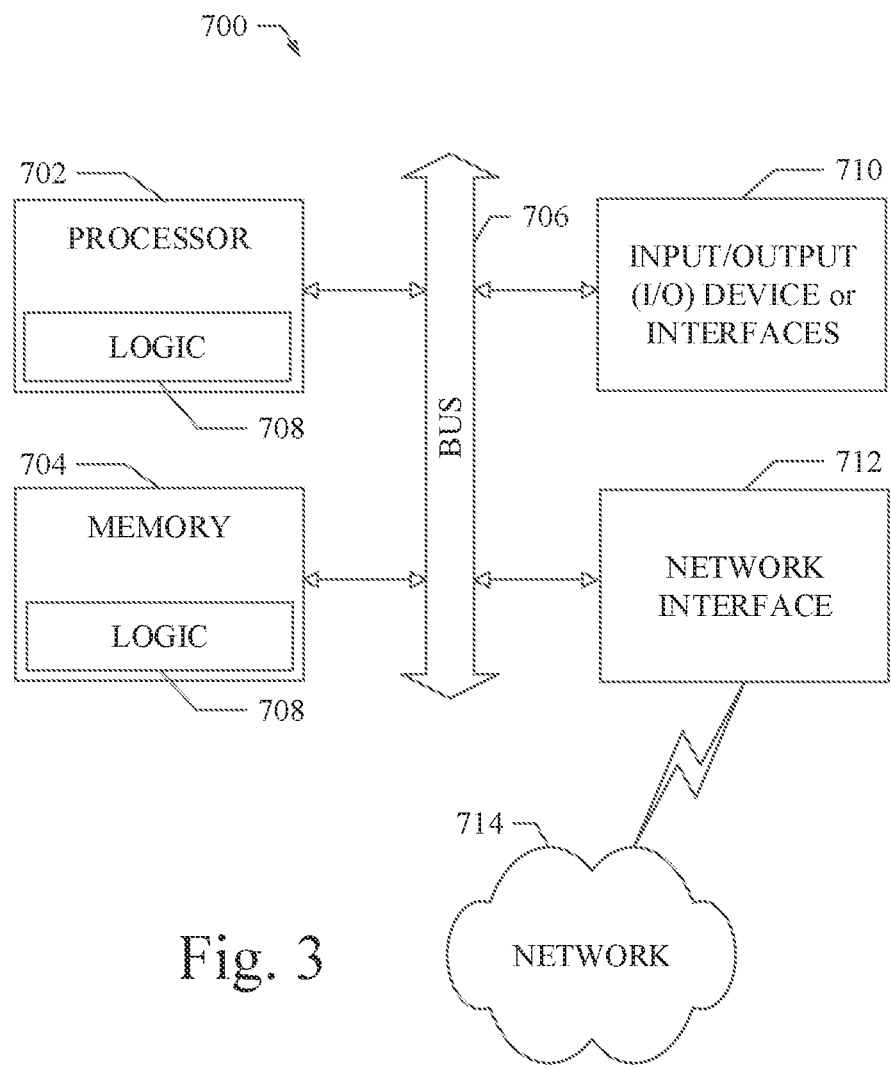
FIG. 3 shows a diagrammatic representation of machine in the example form of a computer system within which a set of instructions when executed may cause the machine to perform any one or more of the methodologies discussed herein.

FIG. 3 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising: a data processor;
a simulated vehicle configuration module, executable by the data processor, to obtain configuration instructions and data for each of a plurality of simulated vehicles, a specific driving behavior for each of the plurality of simulated vehicles corresponding to perception data obtained from perception data sensors; and
a trajectory generator to generate a plurality of trajectories and acceleration profiles to transition each of the plurality of simulated vehicles from a current position and speed to a corresponding target position and target speed, the target position and the target speed corresponding to the specific driving behavior for each of the plurality of simulated vehicles.

2. The system of claim 1 wherein the perception data sensors being of a type selected from the group consisting of: image generating devices, light amplification by stimulated emission of radiation (laser) devices, light detection and ranging (LIDAR) devices, global positioning system (GPS) devices, sound navigation and ranging (sonar) devices, radio detection and ranging (radar) devices, and distance measuring systems.

3. The system of claim 1 wherein the perception data represents real-world traffic environment information related to locations, routings, scenarios, and driver behaviors being monitored.

4. The system of claim 1 wherein the specific driving behavior for each of the plurality of simulated vehicles comprises at least one simulated vehicle with an aggressive driving behavior and at least one simulated vehicle with a conservative driving behavior, wherein aggressive driving behavior corresponds to any of: a simulated vehicle that frequently changes lanes; a simulated vehicle that exhibits steep acceleration and deceleration rates; and a simulated vehicle that travels close to other neighboring vehicles, further wherein conservative driving behavior corresponds to any of: a simulated vehicle that infrequently changes lanes; a simulated vehicle that exhibits moderate acceleration and deceleration rates; and a simulated vehicle that maintains a greater distance from other neighboring vehicles.

5. The system of claim 1 wherein a rule-based process and corresponding data structures are used to generate the target position and target speed corresponding to the specific behavior of each simulated vehicle based the specific driving behavior for each of a plurality of simulated vehicles.

6. The system of claim 1 wherein the vehicle simulation module is further configured to generate a target heading for each of the plurality of simulated vehicles.

7. The system of claim 1 wherein the trajectory generator is further configured to generate a plurality of waypoints for each of the plurality of simulated vehicles, the waypoints representing movement and behavior of each simulated vehicle in a simulation environment.

8. The system of claim 1 wherein the plurality of trajectories and acceleration profiles for each of the plurality of simulated vehicles is used for analyzing a control system of an autonomous vehicle.

9. A method comprising:
obtaining configuration instructions and data for each of a plurality of simulated vehicles, a specific driving behavior for each of the plurality of simulated vehicles corresponding to perception data obtained from perception data sensors; and
generating a plurality of trajectories and acceleration profiles to transition each of the plurality of simulated vehicles from a current position and speed to a corresponding target position and target speed, the target position and the target speed corresponding to the specific driving behavior for each of the plurality of simulated vehicles.

10. The method of claim 9 wherein the perception data sensors are installed in or on a moving test vehicle being navigated through pre-defined routings.

11. The method of claim 9 wherein the perception data comprises vehicle image data or traffic data, wherein the traffic data comprises roadway data, environmental data, or distance data.

12. The method of claim 9 wherein the specific driving behavior for each of the plurality of simulated vehicles comprises at least one simulated vehicle with a first driving behavior and at least one simulated vehicle with a second driving behavior, wherein the at least one simulated vehicle with the first driving behavior changes lanes more frequently than the at least one simulated vehicle with the second driving behavior.

13. The method of claim 9 wherein the configuration instructions and data representing at least one simulated vehicle of the plurality of simulated vehicles with a first driving behavior and at least one simulated vehicle of the plurality of simulated vehicles with a second driving behavior, wherein a probability that the at least one simulated vehicle with the first driving behavior changes lanes, passes maneuver, turns sharply, or stops suddenly, is higher than a probability that the at least one simulated vehicle with the second driving behavior changes lanes, passes maneuver, turns sharply, or stops suddenly.

14. The method of claim 9 wherein the configuration instructions and data representing at least one simulated vehicle of the plurality of simulated vehicles with a first driving behavior and at least one simulated vehicle of the plurality of simulated vehicles with a second driving behavior, wherein a rate of changing acceleration of the at least one simulated vehicle with the first driving behavior is higher than a rate of changing acceleration of the at least one simulated vehicle with the second driving behavior.

15. The method of claim 9 including generating a plurality of waypoints for each of the plurality of simulated vehicles, the waypoints representing movement and behavior of each simulated vehicle of the plurality of simulated vehicles in a simulation environment, wherein each of the waypoints further comprises the target position of the respective simulated vehicle.

16. The method of claim 9 further comprising using the plurality of trajectories and acceleration profiles for each of the plurality of simulated vehicles to create a virtual simulation environment.

17. A non-transitory machine-useable storage medium embodying instructions which, when executed by a machine, cause the machine to:
   obtain configuration instructions and data for each of a plurality of simulated vehicles, a specific driving behavior for each of the plurality of simulated vehicles corresponding to perception data obtained from perception data sensors; and
   generate a plurality of trajectories and acceleration profiles to transition each of the plurality of simulated vehicles from a current position and speed to a corresponding target position and target speed, the target position and the target speed corresponding to the specific driving behavior for each of the plurality of simulated vehicles.

18. The non-transitory machine-useable storage medium of claim 17 wherein the perception data sensors being of a type selected from the group consisting of: image generating devices, light amplification by stimulated emission of radiation (laser) devices, light detection and ranging (LIDAR) devices, global positioning system (GPS) devices, sound navigation and ranging (sonar) devices, radio detection and ranging (radar) devices, and distance measuring systems.

19. The non-transitory machine-useable storage medium of claim 17 wherein the perception data comprises positions of obstacles and locations of available roadways.

20. The non-transitory machine-useable storage medium of claim 17 wherein the configuration instructions and data represent at least one simulated vehicle of the plurality of simulated vehicles with an aggressive driving behavior and at least one simulated vehicle of the plurality of simulated vehicles with a conservative driving behavior.

* * * * *